(12) United States Patent
Shimizu et al.

(10) Patent No.: US 7,749,412 B2
(45) Date of Patent: Jul. 6, 2010

(54) WIDE OPTICAL FILM AND METHOD FOR PRODUCING THE SAME

(75) Inventors: Kazuyuki Shimizu, Akashi (JP); Syouichi Sugitani, Kobe (JP)

(73) Assignee: Konica Minolta Opto, Inc., Tokyo (JP)

( * ) Notice: Subject to any disclaimer, the term of this patent is extended or adjusted under 35 U.S.C. 154(b) by 290 days.

(21) Appl. No.: 11/385,771

(22) Filed: Mar. 22, 2006

(65) Prior Publication Data

US 2006/0216439 A1    Sep. 28, 2006

(30) Foreign Application Priority Data

Mar. 28, 2005   (JP) .............................. 2005-091745

(51) Int. Cl.
*B29D 7/01* (2006.01)
*B29D 11/00* (2006.01)

(52) U.S. Cl. ...................................... 264/2.7

(58) Field of Classification Search ................. 264/146, 264/216, 207, 1.34, 1.6, 2.7; 428/1.3, 1.31, 428/1.33, 1.54
See application file for complete search history.

(56) References Cited

U.S. PATENT DOCUMENTS

| 6,732,625 | B1 * | 5/2004 | Boynton et al. ............... 83/482 |
| 2001/0012089 | A1 * | 8/2001 | Shiraishi ...................... 349/153 |
| 2002/0086163 | A1 * | 7/2002 | Shimizu et al. .......... 428/424.4 |
| 2002/0162483 | A1 * | 11/2002 | Shimizu et al. .......... 106/170.28 |
| 2003/0020208 | A1 * | 1/2003 | Tasaka et al. ................ 264/217 |
| 2003/0179687 | A1 * | 9/2003 | Schoeppel et al. .......... 369/273 |
| 2005/0046074 | A1 * | 3/2005 | Tasaka et al. ................ 264/207 |
| 2005/0211033 | A1 * | 9/2005 | Matsuura ........................ 83/13 |
| 2005/0212172 | A1 * | 9/2005 | Sakamaki ..................... 264/216 |
| 2006/0076707 | A1 * | 4/2006 | Sugiura ........................ 264/234 |
| 2007/0228607 | A1 * | 10/2007 | Narukawa ................... 264/316 |

FOREIGN PATENT DOCUMENTS

| JP | 7-011055 | | 1/1995 |
| JP | 2001-315089 | | 11/2001 |
| JP | 2003-012827 | * | 1/2003 |
| JP | 2003-89093 | | 3/2003 |
| JP | 2003-291091 | | 10/2003 |
| JP | 2004-50307 | | 2/2004 |
| JP | 2004-66505 | | 3/2004 |
| WO | WO 2005115714 A1 | * | 12/2005 |

OTHER PUBLICATIONS

Kyocera Cutting Tools Catalog, 2010-2011, Part II, Section R, Technical Information, pp. R1-R33, Kyocera International Inc, Jan. 1, 2010.*

* cited by examiner

*Primary Examiner*—Sophie Hon
(74) *Attorney, Agent, or Firm*—Finnegan, Henderson, Farabow, Garrett & Dunner, L.L.P.

(57) ABSTRACT

An optical film comprising a cycloolefin resin or a cellulose ester resin, wherein (a) at least one of edges of the optical film is slit; (b) an average surface roughness Ra specified in JISB0601-2001 of a cross-section of the optical film formed by slitting is 0.05 to 0.9 μm; and (c) a width of the optical film is 1400 mm or more.

1 Claim, 1 Drawing Sheet

FIG. 1

WIDE OPTICAL FILM AND METHOD FOR PRODUCING THE SAME

This application is based on Japanese Patent Application No. 2005-091745 filed on Mar. 28, 2005 in Japanese Patent Office, the entire content of which is hereby incorporated by reference.

TECHNICAL FIELD

The present invention relates to an optical film capable of being used as various functional films such as a polarizing plate protective film, a retardation film, or a viewing angle enlarging film, employed in a liquid crystal display (LCD), as well as an antireflection film employed in a plasma display.

The present invention relates to a wide optical film, in which at least one of the edges is slit off and which exhibits particularly excellent uniformity of the retardation value in the lateral direction.

BACKGROUND

In recent years, development of liquid crystal display devices (LCD) has increasingly been made aiming at a decrease in weight by decreasing the depth, an increase in the image area, and enhancement in definition. Along with such development, a decrease in thickness, an increase in width, and higher quality have increasingly been demanded for a polarizing plate protective film. Consequently, accompanied with the enhancement of image quality of liquid crystal display devices, the level in quality of optical films has become more severe.

Commonly and widely employed in the polarizing plate protective film is a cellulose ester film or a cycloolefin film. Along with the recent increase in the screen size, demanded has been a wider and longer roll film.

Incidentally, in either a solution casting film production apparatus or in a melt casting film production apparatus, in cases in which the film edges are slit off between the completion of peeling and the winding, problems have occasionally occurred in that peeled substances (slit scrap) from edge slitting portions of the film are generated.

Further, problems have occurred in that, during casting, film is torn, and along-with generation of slit scrap, so-called "edge rise" is formed at the film edges.

Patent documents, which relate to overcoming of the problems occurring in the film edges during a slitting process include the following:

Patent Document 1 discloses a slitting machine having a beveling portion so that it is possible to slit film with high quality, adhesion of film-slitting dust to a rotary blade is minimized and the slitting capability is maintained for an extended period of time.

Patent Document 2 discloses a film slitting method in Which, between the casting step and the winding step in a film production process employing a solution casting film production method, a step is further provided in which edges are continuously slit off along the film conveying direction while the edge dust is removed. Further, in the film slitting method described in above Patent Document 2, the residual volatile amount of the film during slitting is specified.

Patent Document 3 discloses a film slitting method in which, in the same manner as the case of Patent Document 2, between the casting step and the winding step in a film production process employing a solution casting film production method, a process is further provided in which edges are continuously slit off along the film conveying direction while the edge dust is removed. In the film slitting method of above Patent Document 3, the temperature of the film slitting portions is specified to be less than the glass transition temperature (Tg).

Patent Document 4 discloses an edge dust removing method using air flow, in which the edge dust is further cut in the longitudinal direction into thin strips to easily blow the thin strips using an air flow.

Patent Document 5 discloses a film slitting method in which in order to decrease the formation of slitting dust during slitting and to extend the exchange period of the slitting blade by extending its working life, the edge of a disk-shaped slitting blade is inserted, in a non-contact state, into a groove formed on the film support slitting base.

Patent Document 6 discloses a film production apparatus provided with an edge slitting device which slit off film edges while the slit dust is blown by an air flow, wherein the volatile solvent contained in the air employed for blowing the dust is subjected to adsorption removal employing an adsorption recovery device.

However, when the edges of a recent wider optical film are slit off, it was found that uniformity in optical property in the lateral direction of the optical film was not fully obtained, specifically, uniformity in the retardation vale in the lateral direction of the optical film was not fully obtained, only by reducing the slit scrap and edge rise, as described above.

The above patent documents only describe methods to decrease the slit scrap and to minimize the edge rise, and have not fully overcome the above drawbacks of the wider optical films.

An object of the present invention is to solve the above problem of degradation of optical performance in the lateral direction of the roll film which occurs when the width of which is increased to 1400 mm or more, and to provide an optical film exhibiting excellent quality, for example, uniformity in the retardation value in the lateral direction of the roll film, by conducting a quality control by which slit scrap is reduced, tearing of the film is avoided and the film dimension is stabilized.

Patent Document 1: Japanese Patent Publication for Public Inspection (hereinafter referred to as JP-A) No. 2001-315089
Patent document 2: JP-A No. 7-11055
Patent Document 3: JP-A No. 2003-89093
Patent Document 4: JP-A No. 2003-291091
Patent Document 5: JP-A No. 2004-50307
Patent document 6: JP-A No. 2004-66505

SUMMARY

In view of the foregoing, the inventors of the present invention conducted diligent investigations and discovered that conventional problems were overcome in such a manner that in an optical film, the width of which was extended to 1400 mm or more, the slit edges of the film was examined and the quality index of a cross section of the edge of the slit film was clarified, whereby the present invention was achieved.

A first aspect of the present invention to achieve the above object is an optical film characterized in that in an optical film containing a cycloolefin resin or a cellulose ester resin, at least one of the edges is slit off, average surface roughness Ra specified in JISB0601-2001, of the slit cross section of the aforesaid optical film is 0.05-0.9 μm, and the width of the aforesaid optical film after slitting is 1400 mm or more.

A second aspect of the present invention is the optical film of the first aspect, wherein a thickness of the optical film is 20 to 200 μm.

A third aspect of the present invention is the optical film of the first or the second aspect, wherein the width of the optical film is 1400 to 2500 mm.

A fourth aspect of the present invention is the optical film of the third aspect, wherein the width of the optical film is 1500 to 2000 mm.

A fifth aspect of the present invention is the optical film of the fourth aspect, wherein the width of the optical film is 1500 to 1700 mm.

A sixth aspect of the present invention is a polarizing plate protective film employing the optical film of any one of the first to the fifth aspects.

A seventh aspect of the present invention is a polarizing plate employing the polarizing plate protective film of the sixth aspect.

An eighth aspect of the present invention is a liquid crystal display employing the polarizing plate of the seventh aspect.

A ninth aspect of the present invention is a method for producing an optical film comprising a cycloolefin resin or a cellulose ester resin comprising the steps of:

(i) melt casting or solution casting a cycloolefin resin or a cellulose ester resin on a rotary drum support or on a rotary endless belt support to form a cast film;

(ii) peeling the cast film from the support;

(iii) slitting at least one of two edges of the cast film; and (iv) winding the cast film in a roll, wherein (a) a width of the cast film after slitting is 1400 mm or more; and (b) an average surface roughness Ra specified in JISB0601-2001 of a cross-section of the cast film formed by slitting is 0.05 to 0.9 μm.

In the above first aspect of the present invention, the thickness of the aforesaid optical film is preferably 20-200 μm.

In the above first aspect of the present invention, the width of the aforesaid optical film is preferably 1400-2500 mm, more preferably 1500-2000 mm, but is most preferably 1500-1700 mm.

In the above first aspect of the present invention, the aforesaid optical film is preferably a polarizing plate protective film. In the polarizing plate protective film, specifically, needed is uniformity in the optical property in the lateral direction and the optical film of the present invention is usefully employed.

A second embodiment of the present invention is a polarizing plate employing the aforesaid polarizing plate protective film.

A third embodiment of the present invention is a liquid crystal display device employing the aforesaid polarizing plate.

A fourth embodiment of the present invention is a method for producing an optical film comprising a cycloolefin resin or a cellulose ester resin comprising the steps of: (i) melt casting or solution casting a cycloolefin resin or a cellulose ester resin on a rotary drum support or on a rotary endless belt support to form a cast film; (ii) peeling the cast film from the support; (iii) slitting at least one of two edges of the cast film; and (iv) winding the cast film in a roll, wherein (a) a width of the cast film after slitting is 1400 mm or more; and (b) an average surface roughness Ra specified in JISB0601-2001 of a cross-section of the cast film formed by slitting is. 0.05 to 0.9 μm.

The optical film of the present invention, even though its lateral width is increased, exhibits excellent uniformity in the optical property in the lateral direction and specifically exhibits excellent quality as a polarizing plate protective film.

Further, by employing a polarizing plate protective film composed of the optical film of the present invention, it is possible to provide a polarizing plate which exhibits excellent optical isotropy.

Further, the liquid crystal display device employing this polarizing plate is capable of maintaining stable display performance over an extended period of time.

DESCRIPTION OF THE PREFERRED EMBODIMENTS

The details of the present invention will now be described, however the present invention is not limited thereto.

The optical film of the present invention is prepared in such a manner that (i) casting is performed onto a rotary metal drum or a rotary endless metal belt (serving as a support); (ii) peeling the cast film; (iii) drying or cooling the film followed by stretching; and (iv) in the device to wind the stretched film, slitting off the film edge where the surface roughness (average surface roughness: Ra) of the cross section of the film slit by the final slitting device is controlled within a prescribed value. Consequently, either a melt casting film production apparatus or a solution casting film production apparatus is acceptable.

Examples of film materials of the optical film of the present invention include, a cellulose ester resin and a cycloolefin resin (specifically preferable is a norbornene resin).

Cellulose ester resins include a cellulose ester in which the hydroxyl group originated from cellulose is replaced with an acyl group. Examples include cellulose acylates such as cellulose acetate, cellulose acetate propionate, cellulose acetate butyrate, or cellulose acetate propionate, as well as cellulose acetate having an aliphatic polyester grafted side chain. Of these, preferred are cellulose acetate propionate and cellulose acetate having an aliphatic polyester grafted side chain. Other substituents may be present in the range which does not adversely affect effects of the present invention.

In the example of cellulose acetate propionate, the degree of substitution of the acyl group is preferably 2.0-3.0, while that of the acetyl group is preferably 1.4-2.4. Further, the degree of the acyl group is more preferably 2.5-2.8, while that of the acetyl group is more preferably 1.5-2.0. By controlling the degree of substitution within the above ranges, it is possible to result in desired molding properties when employing a melt casting film production apparatus, and it is possible to achieve desired in-plane direction retardation (Rc), as well as thickness direction retardation (Rt). When the degree of substitution of the acetyl group is less than the above lower limit, humidity and heat resistance as a retardation film is occasionally degraded, while when it is more than the upper limit, required retardation characteristics are occasionally not exhibited.

Introduction of a propionyl group as a substituent is preferred since plasticity of cellulose ester is enhanced, and molding properties are also improved.

Raw cellulose materials of cellulose ester resins employed in the present invention are not particularly limited, and listed as such may be cotton linter, wood pulp, and kenaf. Further, it is possible to employ the cellulose ester resins prepared employing the above upon blending at any appropriate ratio.

In the present invention, when acylating agents are acid anhydrides (such as acetic anhydride, propionic anhydride, or butyric anhydride), cellulose ester resins are prepared employing reaction, in which organic acids such as acetic acid and organic solvents such as methylene chloride as well as protonic catalysts are employed.

When the acylating agents are acid chlorides (such as $CH_3COCl$, $C_2H_5COCl$, or $C_3H_7COCl$), reaction is performed employing basic compounds such as amine as a catalyst. Specifically, it is possible to perform synthesis employing the method described in JP-A No. 10-45804.

It is possible to determine the degree of substitution of the acyl group, employing the method in accordance with ASTM-D817-96.

Listed as cellulose acetate having an aliphatic polyester graft side chain is cellulose acetate having an aliphatic polyester grafted side chain in which lactic acid is employed as a major repeating unit. The degree of acetyl substitution of cellulose acetate having an aliphatic polyester grafted side chain, in which lactic acid is a major repeating unit, is preferably 2.5-3 per glucose unit. Thermoplastic cellulose acetate having a polyester grafted side chain, exhibiting the degree of acetyl substitution within the above range, results in marked plasticity, whereby the fragility of the resulting polymers causes no problems of viability. When the degree of acetyl substitution is less than 2.5, grafting of aliphatic polyester on the side chain results in minor plasticity due to a hydrogen bond via the residual hydroxyl group in the cellulose acetate, whereby molding properties are occasionally unsatisfactory. Further, the degree of acetyl substitution is more preferably 2.7-3.0, but is most preferably 2.7-2.9. Of aliphatic polyesters, polylactic acid having lactic acid as a repeating unit specifically exhibits high thermal stability.

In the present invention, the molecular weight of the aliphatic polyester grafted side chain is preferably 1,000-10,000. By controlling the above molecular weight within 1,000-10,000, it is possible to achieve desired molding properties. The above molecular weight is more preferably 2,000-9,000, but is most preferably 3,000-8,000.

In the present invention, it is possible to synthesize cellulose acetate having an aliphatic polyester grafted side chain, employing a prior art method in which lactide as a monomer undergoes ring-opening graft polymerization. When performing the ring-opening graft reaction, it is possible to employ ring-opening polymerization catalysts known in the art. For example, listed are metals such as tin, zinc, titanium, bismuth, zirconium, germanium, antimony, sodium, potassium, or aluminum, and derivatives thereof. Specifically, preferred derivatives include organic metal compounds, carbonates, oxides, and halides. Exemplified as specific compounds may be tin octanate, tin chloride, zinc chloride, alkoxytitanium, germanium oxide, zirconium oxide, antimony trioxide, and alkylaluminum.

In the present invention, in order to enhance mechanical strength of the film, the number average molecular weight of cellulose ester resins is preferably in the range of 60,000-300,000, but is more preferably in the range of 70,000-200,000.

Listed as cycloolefin resins, specifically norbornene resins, may be (1) resins which are prepared in such a manner that after norbornene monomer ring-opening (co)polymers, if desired, undergo polymer modification such as maleic acid addition or cyclopentadiene addition, hydrogenation is performed; (2) resins which are prepared by in such a manner that norbornene monomers undergo addition polymerization; and (3) resins prepared in such a manner that norbornene monomers undergo addition polymerization together with olefin monomers, such as ethylene or α-olefin. It is possible to perform polymerization and hydrogenation employing conventional methods.

In the present invention, it is possible to incorporate various additives in these cellulose ester resins.

In the present invention, in order to enhance dimensional stability under high humidity and heat, it is preferable that plasticizers are incorporated. Heretofore, it has not been known that plasticizers exhibit improvement effects of dimensional stability. Preferably employed as plasticizers may be conventional plasticizers for cellulose ester. Specifically preferred are those which exhibit compatibility, and for example, preferred are phosphoric acid esters and carboxylic acid esters. Listed as phosphoric acid esters may, for example, be triphenyl phosphate, tricresyl phosphate, and diphenyl phosphate. Listed as carboxylic acid esters may be phthalic acid esters and citric acid esters; listed as phthalic acid esters may, for example, be dimethyl phthalate, dioctyl phthalate, and diethylhexyl phthalate; and listed as citric acid esters may be acetyl trimethyl citrate and acetyl tributyl citrate. Further, other than those listed above are butyl oleate, methyl acetyl ricinolate, dibutyl sebacate, and triacetin. Also preferably employed is alkylphthalyl alkyl glycolates. The alkyl group of alkylphthalyl alkyl glycolates is one having 1-8 carbon atoms. Preferably employed as alkylphthalyl alkyl glycolates are methylphthalyl methyl glycolate, ethylphthalyl ethyl glycolate, propylphthalyl propyl glycolate, butylphthalyl butyl glycolate, octylphthalyl octyl glycolate, methylphthalyl ethyl glycolate, ethylphthalyl methyl glycolate, ethylphthalyl propyl glycolate, propylphthalyl ethyl glycolate, methylphthalyl propyl glycolate, methylphthalyl butyl glycolate, ethylphthalyl butyl glycolate, butylphthalyl methyl glycolate, butylphthalyl ethyl glycolate, propylphthalyl butyl glycolate, butylphthalyl propyl glycolate, methylphthalyl octyl glycolate, ethylphthalyl octyl glycolate, octylphthalyl methyl glycolate, and octylphthalyl ethyl glycolate. Of these, preferred are methylphthalyl methyl glycolate, ethylphthalyl ethyl glycolate, propylphthalyl propyl glycolate, butylphthalyl butyl glycolate, and octylphthalyl octyl glycolate, of which ethylphthalyl ethyl glycolate is most preferably employed. Plasticizers exhibiting a large molecular weight are preferred since it is possible to retard volatilization during extrusion molding. Such examples include aliphatic polyesters composed of glycol and dibasic acid such as adipate, polybutylene adipate, polyethylene succinate; aliphatic polyesters composed of oxycarboxylic acid such as polylactic acid or polyglycolic acid; aliphatic polyesters composed of lactone such as polyvalerolctone; and polyvinyl polymers such as polyvinylpyrrolidone. The above plasticizers may be employed individually or in combination.

The content of the above plasticizers is preferably 1-30 percent by weight with respect to the cellulose ester resins. By controlling the content of the plasticizers within the above range, it is possible to enhance, under high humidity and temperature, the dimensional stability of the cellulose ester resinous film.

Listed as UV absorbers usable in the present invention may, for example, be oxybenzophenone compounds, benzotriazole compounds, salicylic acid ester compounds, benzophenone compounds, cyano acrylate compounds, and nickel complex compounds, of which benzotriazole compounds, which are more transparent, are preferred. Also preferably employed are UV absorbers described in JP-A Nos. 10-182621 and 8-337574, as well as polymer UV absorbers described in JP-A No. 6-148430. In view of minimizing degradation of polarizer and liquid crystals, preferred as a UV absorber, are those which efficiently absorb ultraviolet radiation at a wavelength of 370 nm or shorter, while in view of liquid crystal display properties, preferred are those which exhibit minimal absorption of visible light at a wavelength of 400 nm or longer.

Examples of UV absorbers which are preferably usable in the present invention include 2-(2'-hydrox-5'-methylphenyl) benzotriazole, 2-(2'-hydroxy-3',5'-di-tert-butylphenyl)benzotriazole, 2-(27-hydroxy-3'-tert-butyl-5'-methylphenyl)benzotriazole, 2-(2'-hydroxy-3',5'-tert-butylphenyl)-5-chlorobenzotriazole, 2-(2'-hydroxy-3'-(3",4",5",6"-tetrahydrophthalimidomethyl)-5'-methylphenyl) benzotriazole, 2,2-methylenebis(4-(1,1,3,3-tetramethylbutyl-6-(2H-benzotriazole-2-yl), 2-(2'-hydroxy-3'-tert-butyl-5'-methylphenyl)-5-chlorobenzotriazole, and 2-(2H-benzotriazole-2-yl-6-(straight and branched chain dodecyl)-4-methylphenol, as well as a mixture of octyl-3-[3-tert-butyl-4-hydroxy-5-(chloro-2H-benzotriazole-2-yl)phenyl]propionate and 2-ethylhexyl-3-[3-tert-butyl-4-hydroxy-5-(5-chloro-2H-nenzotriazole-2-yl)phenyl]propionate, however, the examples are not limited thereto. Also preferably employed are commercially available products such as TINUVIN 109, TINUVIN 171 and TINUVIN 326, all produced by Ciba Specialty Chemicals Co.

Listed as specific examples of benzophenone compounds may be 2,4-dihydroxybenzophenone, 2,2'-dihydroxy-4-methoxybenzophenone, 2-hydroxy-4-methoxy-5-sulfobenzophenone, and bis(2-methoxy-4-hydroxy-5-benzoylphenylmethane, however these examples are not limited thereto.

The addition amount of these UV absorbers is preferably 0.01-10 percent by weight with respect to the cellulose ester resins, but is more preferably 0.1-5 percept by weight. When the used amount is excessively small, cases have occurred in which UV radiation absorbing effects are insufficient, while when it is excessively large, cases have occurred in which film transparency is degraded. The UV absorbers are preferably stable against heat.

When the degree of substitution of the acetyl group of cellulose ester resins is low, heat resistance is occasionally degraded. In such a case, it is effective to incorporate antioxidants.

Preferably employed as an antioxidant are hindered phenol compounds. Preferred are 2,6-di-t-butyl-p-cresol, pentaerythrityl-tetrakis[3-(3,5-di-t-butyl-4-hydroxyphenyl)propionate], triethyleneglycol-bis[3-(t-butyl-5-methyl-4-hydroxyphenyl)propionate], 1,6-hexanediol-bis[3-(3,5-di-t-butyl-4-hydroxyphenyl)propionate], 2,4-bis-(n-octylthio)-6-(4-hydroxy-3,5-di-t-butylanilino)-1,3,5-triazine, 2,2-thio-diethylenebis[3-(3,5-di-t-butyl-4-hydroxphenyl)propionate], octadecyl-3-(3,5-di-t-butyl-4-hydroxyphenyl)propionate, N,N'-hexamethylenebis(3,5-di-butyl-4-hydroxy-hydrocinnamide), 1,3,5-trimethyl-2,4,6-tris(3,5-di-t-butyl-4-hydroxybenzyl)benzene, and tris-(3,5-di-t-butyl-4-hydroxybenzyl)-isocyanurate, in which 2,6-di-t-butyl-p-cresol, pentaerythrytyl-teteakis[3-(3,5-di-t-butyl-4-hydroxyphenyl) propionate], triethyleneglycol-bis[3-(3-t-butyl-5-methyl-4-hydroxyphenyl)propionate are particularly preferred. Further, simultaneously employed may, for example, be hydrazine based metal deactivators such as N,N'-bis[3-(3,5-di-t-butyl-4-hydroxyphenyl)propionyl]hydrazine, as well as phosphorous based process stabilizers such as tris(2,4-di-t-butylphenyl)phosphite.

In order to provide lubricating properties, it is preferable that minute particles such as matting agents are incorporated in the cellulose derivatives of the present invention. Listed as such minute particles are those composed of inorganic or organic compounds.

Examples of minute particles composed of inorganic compounds include those composed of silicon dioxide, titanium dioxide, aluminum oxide, zirconium oxide, and tin oxide. Of these, preferred are minute particles composed of compounds incorporating silicon atoms, and minute silicon dioxide particles are particularly preferred. Listed as minute silicon dioxide particles are AEROSIL 200, 200V, 300, R972, R972V, R974, R202, R812, R805, OX50, and TT600, all produced by Aerosil Co.

Examples of minute particles composed of organic compounds include those composed of acrylic resins, silicone resins, fluororesins, and urethane resins.

The primary particle diameter of the minute particles is not particularly limited. The final average particle diameter in the film is preferably about 0.05-about 5.0 μm, but is more preferably 0.1-1.0 μm.

The average diameter of minute particles refers to the average value of the particle length in the major axis direction of the film viewed when the cellulose ester film is observed employing an electron microscope or an optical microscope. The observed particles in the film may be either primary particles, or secondary particles which are formed by coagulation of primary particles, but most of the particles usually observed are secondary particles.

One example of a measurement method follows. Vertical cross section at 10 randomly selected sites per film is photographed, and the number of particles at a major axis length of 0.05-5 μm in an area of 100 μm$^2$ is recorded. Subsequently, the average value of the measured length in the major axis direction is obtained, and the average value of 10-position measurements is designated as the average particle diameter.

In the case of minute particles, the primary particle diameter, the particle diameter after dispersion in solvents, and the particle diameter after the addition to the film tend to vary. Further, particles in the film are combined with cellulose ester to form coagulated particles. Thereby, it is critical to control the particle diameter of the final formed particles in the film.

When the above average diameter of minute particles exceeds 5 μm, haze may increase and the minute particles may function as foreign matter in a wound film to result in problems. On the other hand, when it is less than 0.05 μm, it becomes difficult to provide lubrication in the film.

The used amount of the above minute particles in cellulose ester is commonly 0.04-0.5 percent by weight with respect of the cellulose ester, is preferably 0.05-0.3 percent by weight percent, but is more preferably 0.05-0.25 percent by weight. When the added amount of the minute particles is at most 0.04 percent by weight, the surface is excessively smooth, blocking results due to an increase in friction coefficient, while when it exceeds 0.5 percent by weight, the friction coefficient of the film surface is excessively lowered, resulting in non-uniform winding during winding, a decrease in transparency and an increase in haze, whereby the resulting film offers no value as a film for liquid crystal displays. Consequently, it is essential to control the addition amount within the above range.

It is preferable that dispersing minute particles is processed in such a manner that a composition prepared by mixing minute particles with solvents, employing a high pressure homogenizer, is processed employing a high pressure homogenizer. The high pressure homogenizer, employed in the present invention, is an apparatus which creates specific conditions such as high shearing and high pressure by allowing a composition prepared by mixing minute particles with solvents to pass through a narrow pipe at a high flow rate.

When processed in such a high pressure homogenizer the maximum pressure condition in the homogenizer, for example, is preferably at least 980 N/cm$^2$ in the narrow pipe at a diameter of 1-2,000 μm, but more preferably 1,960

N/cm². During operation, even though the maximum rate reaches 100 m/second, a homogenizer is preferred in which the heat transfer rate reaches 100 kcal/hour.

Listed as a high pressure homogenizer, described as above, are, for example, an ultra-high pressure homogenizer (trade name MICROFLUIDIZER), produced by Microfluidics Corporation, or NANOMIZER, produced by Nanomizer Co. In addition, listed are MANTON GAULIN type high pressure homogenizers such as HOMOGENIZER, produced by Izumi Food Machinery Co.

In the case of casting resinous sheets employing a melt casting film production apparatus or a solution casting film production apparatus, it is possible to cast film employing any of the conventional methods.

Now, the melt casting film production apparatus will be described.

In the present invention, to prepare an optical film employing the melt casting film production method, it is preferable to specifically use either norbornene resins or cellulose acylate resins, as a resinous material of the film.

Though not shown in the FIGURE, the melt casting film production apparatuses include those employing a melt extrusion method, such as a method employing either a T-die or an inflation method, a calendaring method, a heat press method, or an ejection molding method. Of these, preferred is the melt casting film production apparatus (being the melt extrusion film production apparatus), employing a T-die, which results in uniform thickness, enables easy control of the thickness of about 50-about 500 μm, and enables decreasing the absolute value of retardation and fluctuation thereof.

When the melt casting film production apparatus is employed, it is possible to achieve molding under the same conditions as those employed for common thermoplastic resins. For example, either dried norbornene resins or cellulose ester resins are melted at an extrusion temperature of 200-300° C., employing a 1- or 2-axis type extruder, and subsequently foreign matter is removed by filtration employing a leaf disk type filter. Thereafter, the melt is extruded in the form of a sheet from a T-die and solidified on a chilling drum.

In the course of introduction from a feeding hopper to an extruding device, it is preferable to minimize oxidation decomposition by reducing pressure or employing inert gases.

The temperature of the chilling drum is preferably less than or equal to the glass transition temperature (Tg). In order to achieve close contact between the resinous film and the chilling drum, it is preferable to use any of several methods such as a method in which close contact is achieved via application of electrostatic charge, a method in which close contact is achieved employing air pressure, a method in which close contact is achieved by nipping the entire width or edges, or a method in which close contract is achieved by reducing ambient pressure.

In order to decrease surface defects such as a die line, it is preferable that structures are made so that the hold-up portion in the piping from the extrusion machine to the die is as small as possible. Further, it is preferable to employ dies without flaws in the interior and also lips without flaws. It is preferable to suck ambient air incorporating volatile components since die lines occasionally result due to deposition of volatile components from resins on the dies. Further, since deposition occasionally results on an electrostatic charge applying devices, it is preferable to minimize the deposition by applying alternating current or employing other heating means.

Additives such as plasticizers or antioxidants may be mixed previously with resins or may be kneaded into the resins in the extruder. In order to achieve uniform incorporation, it is preferable to employ mixers such a static mixer.

The thickness of sheets is not particularly limited and may be set so that the desired thickness is achieved after stretching, which is preferably 50-500 μm. Of course, the more uniform the thickness, the more preferred. Variation of thickness over the entire surface is commonly within ±5 percent, is preferably within ±3 percent, but is more preferably within ±1 percent.

Norbornene resinous sheets molded employing the melt casting film production apparatus, described above, are characterized in that retardation (Rt) in the thickness direction is less than those molded employing the solution casting film production apparatus. By stretching the norbornene sheet prepared as above, desired in-plane retardation (Ro) is easily achieved. Since it is unnecessary to increase the stretching factor, it is possible to prepare a norbornene resinous film exhibiting high transparency without cloudiness.

Subsequently, the resulting film is stretched in the one axis direction. The preferred stretching factor during the stretching process may be 5-30 percent. The molecules are oriented by stretching. Though not particularly limited, preferably employed is a conventional pin tenter or clip system tenter. As to stretching direction, employed may be the longitudinal direction, the lateral direction or any other direction (such as an oblique direction). However, in the present invention, the stretching direction is preferably lateral since it is possible to perform lamination with the polarizing film in the form of a roll. By stretching in the lateral direction, the delayed phase axis of the norbornene resins film results in the lateral direction. On the other hand, the transmission axis of the polarizing film is commonly in the lateral direction. By arranging, in the liquid crystal display device, a polarizing plate in which lamination is performed so that the transmission axis of the polarizing film and the delayed phase axis of the norbornene resinous film are parallel, an excellent viewing angle is obtained.

Under stretching conditions, it is possible to select the temperature as well as the stretching factor to result in the desired retardation characteristics. Stretching is performed under conditions such that the stretching factor is commonly in the range of 1.1-2.0, but is preferably in the range of 1.2-1.5, while the stretching temperature is commonly in the range of Tg of resins composing the sheet to Tg+50° C., but is preferably in the range of Tg to Tg+40° C. When the stretching factor is excessively small, occasionally, it is not possible to achieve the desired retardation, while when it is excessively large, breakage occasionally results. When the stretching temperature is excessively low, breakage occasionally occurs, while when it is excessively high, it is occasionally not possible to achieve the desired retardation.

When the retardation of the optical film prepared employing the above method is revised to reach the targeted value, the film may be subjected to stretching or contraction in either the longitudinal direction or the lateral direction. In order to achieve such a contraction in the longitudinal direction, for example, lateral stretching is temporarily clipped out, and relaxation is performed in the longitudinal direction. Further, a method is available, in which the film is subjected to contraction by gradually reducing the distance between the adjacent clips in the lateral stretching apparatus. It is possible to realize the latter employing a method which smoothly and gradually narrows the distance between adjacent clips in the longitudinal direction by driving the clip portions, employing, for example, a pantograph system or a linear drive system in a common simultaneous biaxial stretching apparatus. Further, since it is not possible to use, as a commercial product, both edges of the film held by the clips due to their deformation, they are cut off and reused as raw material.

The resulting film is wound in a winding process, employing any commonly used method. Such methods include a constant torque method, a constant tension method, a temper tension method, and an constant internal stress maintaining method, and any of these may appropriately be selected and then used.

In the production apparatus of the optical film of the present invention, it is preferable to set the optical film production rate at 30-100 m/minute.

In the present invention, the optical film containing a cycloolefin resin or a cellulose ester resin is characterized in that at least one edge of the above optical film is slit off; the average surface roughness Ra specified in JIS B 0601-2001 which is also specified in ISO4287-1997 of the cross section of the slit film is 0.05-0.9 μm; and the width of the above optical film is at least 1400 mm.

In the film at a width of more than or equal to 1400 mm, by controlling the upper limit of the above average surface roughness to be at most the upper limit, it is possible to prepare an optical film which exhibits uniformity in the retardation value in the lateral direction. Further, in terms of production, it is difficult to achieve the above average surface roughness of at most 0.05 μm, which necessitates special treatment, resulting in increase in production cost.

The above surface roughness of the film cross section is determined employing a surface roughness meter (Newview 5010) produced by ZYGO Corp. under meter conditions at an objective lens by a factor of 50 and an image zoom by a factor of 1.3. In this case, measurement conditions are appropriately set employing a Mesure Cntrl Key, followed by data processing by appropriately setting an Analyze Cntrl Key.

Figure 1:
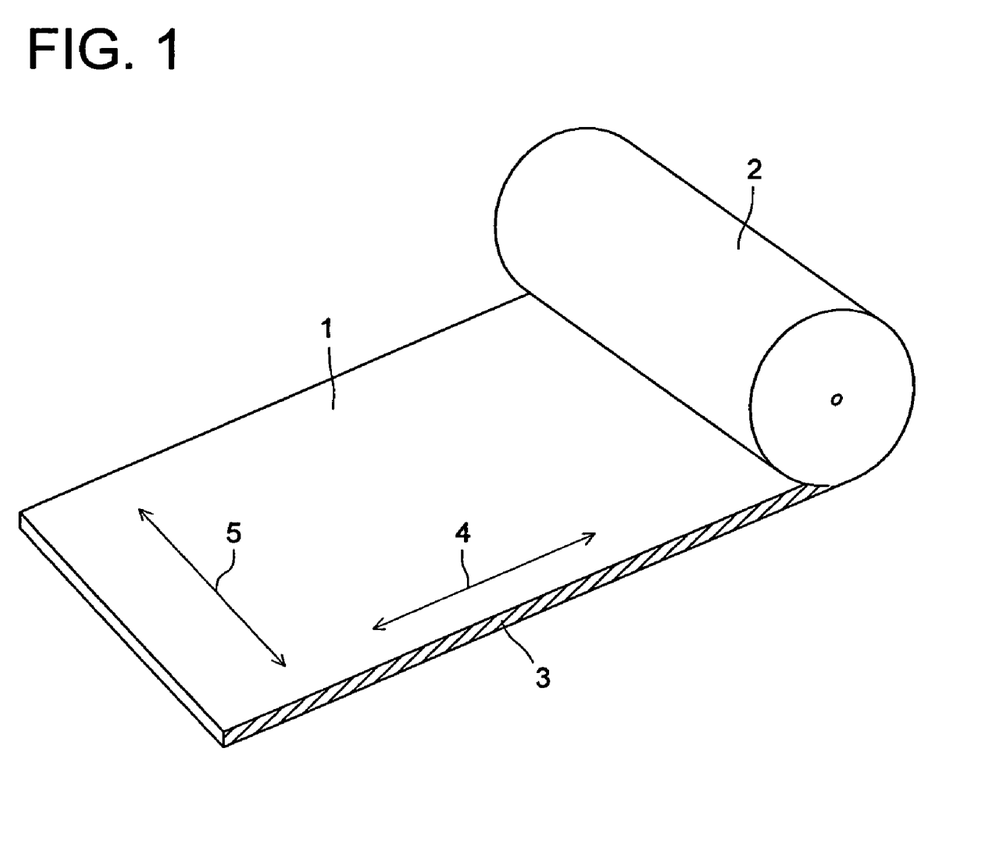
FIG. 1 illustrates one embodiment of an optical film of the present invention.

FIG. 1 illustrates a cross-section of one embodiment of an optical film of the present invention formed by slitting. In FIG. 1: 1 represents an optical film of one embodiment of the present invention; 2 represents a roll of the optical film; 3 represents a cross-section of the optical film formed by slitting; 4 represents the longitudinal direction or MD direction of the optical film; and 5 represents the lateral direction, TD direction or transverse direction of the optical film.

When the optical film of the present invention is produced, it is preferable that 1-3 slitting devices are arranged at the edge portion on one side of the film.

When an edge of the optical film of the present invention is slit off, it is preferable that the slitting device is composed of a disk type upper rotary blade and a roller type lower rotary blade.

It is preferable that the disk type upper rotary blade of the slitting machine has a diameter of 30-300 mm and a thickness of the slitting portion of 0.3-3 mm, and the material of the upper rotary blade is composed of any of super steel, fine grain super steel, SKD (alloy tool steel), or SKH (high speed tool steel). Further, it is preferable that the toe-in angle of the upper blade is set at 30-90 degrees.

It is preferable that the roller type lower rotary blade exhibits a roller diameter of 75-200 mm and the roller material of the above lower rotary blade is composed of any of super steel, fine grain super steel, SKD, or SKH.

In the optical film production apparatus of the present invention, the film slitting device may be composed of only a disk type upper rotary blade. In such a case, it is preferable that the disk type upper rotary blade of the slitting device has a diameter of 30-300 mm and a thickness of the slitting portion of 0.3-3 mm, and the material of the above upper rotary blade is composed of any of super steel, super steel fine grain, SKD, or SKH.

In the present invention, it is preferable to set the temperature and relative humidity around the slitting device at 20-50° C. and 50-70% RH, respectively.

By appropriately selecting the material for the rotary blade, and by appropriately controlling slitting conditions as described above, it is possible to control the surface roughness of the film cross section.

Further, in the present invention, it is preferable that the area around the upper blade is enclosed and a suction device is arranged which sucks air at a rate of 0.8-10 m/second. In such a case, the suction position of the film edge is located downstream in the conveying direction from the slitting point.

In the present invention, it is preferable to arrange a mechanism which conveys the slit edge films (film scraps) to the following film cutting process. For example, it is preferable to arrange a mechanism which nips and/or sucks slit film scraps.

Further, it is preferable to arrange a mechanism which nips and/or winds the slit off edge films.

Further, it is preferable that the draw ratio, namely a value obtained by dividing the speed of the film nipped and/or wound by the speed of the slit edge film is controlled to be 0.8-1.5.

Further, it is preferable that suction pressure is controlled from −100 to −1,000 Pa, while the nip pressure is controlled from 0.1 to 17 MPa.

In the production apparatus of the optical film of the present invention, the width and thickness of the slit off film edge are controlled to be 20-150 mm and 30-150 μm, respectively.

The present invention also includes a method in which a conveying film is covered with a masking base and then slit.

Masking base materials are not specifically limited as long as they are capable of protecting the film, examples of which include polyethylene terephthalate (PET) film, polyethylene (PE) film, and polypropylene (PP) film.

Further, it is preferable to control the static charge amount of slit off film edges within 0-±10 kV. To achieve the above, it is preferable to arrange a charge eliminating device around the upper blade, and for example, employed as such a charge eliminating device is, any of a charge eliminating bar, a charge eliminating blower, and a charge eliminating wire.

It is preferable to process slit off film edges (film scraps) employing an edge cleaner.

It is further preferable that the edge portions of film products after slitting is processed employing a web cleaner followed by removing slitting chips.

In the present invention, the thickness of the optical film varies depending on the purposes of application, but the thickness of finished film is preferably 20-200 μm. To meet the recent trend of decreased thickness, the thickness is more preferably in the range of 30-120 μm, but is most preferably in the range of 40-100 μm. It is possible to achieve the desired thickness by controlling the amount of extrusion, the slit gap of the die cap metal, and the rate of the cooling drum. Further, as a means to achieve uniform film thickness, it is preferable that by employing a film thickness monitoring method, the film thickness is controlled in such a manner that programmed feed-back information is subjected to feed-back to the above film forming devices.

In the present invention, upon preparing an optical film employing a casting film production apparatus, casting is performed onto a rotary metal drum (serving as a support), and after peeling, cooling and stretching are performed. Subsequently, in the device to wind the stretched film, during the period from the peeling to the winding, at least one device which slits a film edge is arranged at the edge portion on at least one side of either left or right edge, and the surface roughness (average surface roughness Ra) of the cross section of the film which is slit, employing at least a final slitting device, is specified to be 0.05-0.9 µm. By employing the optical film of the present invention, which results in the desired surface roughness of the cross section of the edge, the aforesaid drawback, such as degradation of uniformity in the optical property in the lateral direction which may occur in a wide optical film of a width of 1400 mm or more, is overcome. Simultaneously, it is possible to decrease film scraps peeled from the film cross section or to improve the dimensional stability of the optical film, whereby it is possible to produce an optical film of excellent quality. When the slitting device is not satisfactory, undesired tension may be applied to the optical film while the optical film is subjected to slitting, resulting in forming cockling on the film, whereby uniformity in the retardation value in the lateral direction of the optical film is degraded.

Further, according to the present invention, to maintain the quality of the optical film, suitable slitting facilities and suitable slitting conditions has been specified, whereby it has become possible to overcome the aforesaid conventional drawbacks.

The solution casting film production apparatus will now be described.

During production of the optical film according to the present invention, in the solution casting film production apparatus, conducted are a dope preparation process, a casting process, a drying process, a surface treatment process and a winding process, in the stated order.

Though not shown in the FIGURE, initially charged into a dissolution vessel are cellulose ester resins as a film material resin, and solvents, which are mixed followed by dissolution, whereby a cellulose ester resinous solution (being a dope) is prepared. Thereafter, the dope is introduced into a primary filter to achieve primary filtration. The dope, after the primary filtration, is temporarily stored in a dope stock vessel. Subsequently, the above dope is introduced into a secondary filter whereby secondary filtration is performed.

On the other hand, the solution of additives such as UV absorbers, which has been prepared in the additive solution dissolution vessel and filtered, is subjected to in-line addition. After that addition, the resulting dope is introduced into a casting die and a cellulose ester film is prepared employing a solution casting film production apparatus.

In the casting process of the solution casting film production process, the dope, prepared as above, is fed into a pressure die through a pressure type metering gear pump and subsequently is cast from the pressure die onto a casting support, such as a looped metal belt or a rotary metal drum. The surface of the casting supports is finished to be specular.

Other casting methods include a doctor blade method in which the thickness of a cast dope is controlled by a blade, and a method in which the thickness is controlled employing a reverse rotating roller. Of these, preferred is the pressure die in which the slit shape of the sleeve portion is controllable, which enables easy control of uniform film thickness. The pressure dies include a coat hanger die and a T-die, either of which are preferable.

To increase the film production rate, at least two pressure dies are provided above the casting support and multilayer casting may be performed employing at least two different dopes. Alternatively, by dividing the interior of the die, employing slits, it is possible to prepare a lamination structured cellulose ester film by simultaneously casting (also called co-casting) a plurality of dopes which differ in composition.

As noted above, the resulting dope is cast onto the support such as the belt or the drum to make a film. In the present invention, a employing a belt is particularly effective. The reason is that it is easy to minutely control drying conditions on the support, as described below.

In a solvent evaporation process, a web (in the present invention, a dope film which is formed by casting a dope onto a casting support is called a web) is heated on the casting support to evaporate solvents. Methods to evaporate solvents include a method in which air is blown from the web side and/or heat is supplied from the reverse side of the support, and a method in which heat is supplied from the surface and the obverse employing radiant heat. Of these, in terms of drying efficiency, preferred is the method in which heat is supplied from the liquid in the reverse surface. A method is also preferred in which these are in combination. It is preferable that the web on the support after casting is dried at an ambience of 40-100° C. while it stays on the same support. In order to maintain the web at the ambience of 40-100° C., it is preferable that air heated to the above temperature is applied onto the upper surface of the web, or the web is heated employing means such as infrared radiation.

In the present invention, it is specifically preferable that the aforesaid web is peeled from the support within 30-90 seconds after casting. When it is peeled within 30 seconds, the film surface quality is degraded and water-vapor permeability is also degraded. On the other hand, when the drying period exceeding 90 seconds is not preferred since degradation of the surface quality such as poor peeling properties occurs and the film results in marked curling.

In a peeling process, the web which has been subjected to solvent evaporation on the support is peeled from the support at the peeling position. The peeled web is conveyed to the subsequent process. When the residual solvent amount (represented by the formula below) is excessively large, it is difficult to achieve peeling, while when peeled upon being sufficiently dried on the support, during peeling, a part of the web may be stripped off.

The temperature at the peeling position on the support is preferably 10-40° C., but is more preferably 11-30° C. The residual solvent amount at the above peeling position is preferably 25-120 percent by weight, but is more preferably 40-100 percent by weight.

In the present invention, the residual solvent amount of the web is defined on the following formula.

Residual solvent amount=(weight of a web prior to heating treatment−weight of the web after heating treatment)/(weight of the web after heating treatment)×100 percent The heating treatment, when the residual solvent amount is determined, means that the heating treatment is conducted at 115° C. over one hour.

As noted above, in order to control the residual solvent amount, it is preferable that the temperature in peeling position on the casting support is set in the above temperature range so that organic solvents are effectively evaporated from the web by controlling the surface temperature of the casting support after casting. In order to control the support temperature, it is preferable to employ a heat transfer method resulting in a high heat conductivity, such as a reverse surface heat transfer method employing liquid.

Heat transfer methods employing radiant heat or heated air flow are not considered as a preferable method since it is difficult to control the temperature of the support. In a looped belt (being a support) apparatus, when the belt is conveyed to the lower side, it is possible to control the temperature of the belt employing a mild air flow.

It is possible to partially change the temperature of the support by dividing the heating device, whereby the temperature of the casting position, drying section, and peeling position of the support may differ.

As a method to increase the film making rate (since peeling is performed under the presence of the residual solvent amount as much as possible, it is possible to increase the film making rate), a gel casting method is usable, which enables peeling even under a large amount of residual solvents.

The above method includes a method in which poor solvents with respect to cellulose ester resins are incorporated in the dope, and after casting the resulting dope, gelling is conducted, and a method in which gelling is conducted by lowering the temperature of the support. Further, a method is usable in which metal salts are incorporated in the dope. Still further, gelling is conducted on the support to strengthen the film and shorten the period until peeling, whereby it is possible to enhance the film making rate.

When the optical film according to the present invention, composed of cellulose ester resins, is employed as a polarizing plate protective film, it is preferable that the above optical film is papered is such a manner that after making the film, the resulting film is stretched in the MD direction (representing the machine direction or the longitudinal direction) while the residual solvents is 40 percent by weight or more, and when the residual solvents is less than 40 percent, it is preferable to stretched the above film in the TD direction (representing the transverse direction or the lateral direction). The reason why the film is stretched in the MD direction while the residual solvent is not more than 40 percent by weight, and it is stretched in TD direction while the residual solvent is less than 40 percent by weight, is that, if the peeled film having higher amount of residual solvent is stretched in both MD and TD directions, the orientation in the cellulose ester resin caused by the stretching in the MD direction is disturbed by the stretching in the TD direction, resulting in lowering the elastic modulus of the optical film. It is preferable to stretch the aforesaid film in the MD direction when the residual solvents are 60-120 percent by weight, but is most preferably to stretch the same when the residual solvents are 90-110 percent by weight. When the residual solvents are 1-30 percent by weight, it is preferably to stretch the film in the TD direction, but it is most preferably to stretch the film, when the residual solvents are 5-20 percent by weight.

The stretching factor of the cellulose ester resinous film, employed as a polarizing plate protective film, is preferably 1.05-1.3 in both MD and TD directions, but is more preferably 1.05-1.15. By stretching in the Md and TD directions, the area is preferably enlarged by a factor of 1.12-1.44, but is more preferably 1.15-1.32, which can be obtained by the stretching factor in the MD direction×the stretching factor in the TD direction. It is not preferable that the stretching factor in the MD direction is less than 1.05, since elastic modulus enhancing effects are small. On the other hand, it is not preferable that the stretching factor in the TD direction is less than 1.05, since Ro decreasing effects are small. Further, it is not preferable that the stretching factor exceeds 1.3 since haze is enhanced.

In order to stretch in the MD direction, it is preferable to peel at peeling tension of at least 130 N/m but is most preferable at the same of 150-170 N/m. The web after peeling incorporates a large amount of residual solvents. Therefore, it is possible to achieve stretching in the MD direction by maintaining the tension similar to the peeling tension. As the web is dried and the amount of the residual solvents decreases, the stretching factor in the MD direction decreases.

When employed as a polarizing plate protective film, the roller span of the stretching zone to stretch a cellulose ester resinous film in the MD direction is preferably at most 1.0 m. When the cellulose ester resinous film exhibiting the molecular weight distribution as described in the present invention is stretched in the MD direction under the presence of a large amount of the residual solvents, stretch tends to result in the MD direction. However, when the roller span is at most 1.0 m, it is possible to minimize the stretch. Further, during stretching in the Md direction, the temperature of the film is preferably in the range of 10-40° C., whereby film flatness is improved.

The stretching factor in the MD direction of the present invention was calculated on the rotating speed of the belt support and the driving speed of the tenter.

Stretching in the TD direction is performed, employing, for example, the method (called a tenter system) disclosed in JP-A No. 62-46625 in which drying is conducted in such a manner that in the entire or partial process, both edges are held in the lateral direction, employing clips or pins while maintaining the web width. Of the above system, preferably employed are a tenter system employing clips and a pin tenter system employing pins.

In the case of practicing the tenter, the drying temperature is preferably 30-150° C., is more preferably 80-150° C., but is most preferably 100-140° C. Lower drying temperature results in minimal evapotranspiration of UV absorbers and plasticizers to achieve less stained process. On the other hand, higher drying temperature results in excellent flatness and elastic modulus of the film. When the cellulose ester resinous film is stretched, foreign matter tends to be stuck out on the surface, resulting in more foreign matter problems than usual. Consequently, the present invention exhibits effects specifically in cellulose ester resinous films prepared employing a stretching process.

In the present invention, it is possible to obtain in-plane retardation value Ro as follows. By employing an automatic birefringence meter, KOBRA-21ADH, produced by Oji Scientific Instruments, three-dimensional refractive indexes are determined at a wavelength of 590 nm and the above value is calculated on the resulting refractive indexes Nx, Ny, and Nz.

The in-plane retardation value Ro is preferably 20-200 nm, while retardation value Rt in the thickness direction is preferably in the range of 70-400 nm.

$$Ro = (Nx - Ny) \times d$$

$$Rt = \{(Nx+Ny)/2 - Nz\} \times d$$

wherein Nx, Ny, and Nz each represent a refractive index in principal axis x, y, and z directions of an ellipsoid, while Nx and Ny each represent a refractive index in the in-plane direction of a film, and Nz represents the refractive index in the thickness direction of a film, in which $Nx \geq Ny$, and d represents the thickness (in nm) of a film.

In the cellulose ester resinous film or the cycloolefin resinous film of the present invention, angle θ (in radian) of the delayed axis direction to the film making direction, and retardation value Ro in the in-plane direction hold the following relationship, which results in particularly preferred use as optical films such as a polarizing plate protective film.

$$P \leq 1 - \sin^2(2\theta) \sin^2(Ro/\lambda)$$

wherein P is less than or equal to 0.9999.

θ represents the angle (in radian) of the in-plane delayed axis direction of the film to the film making direction (the film conveying direction), λ represents 590 nm which is the wavelength of the light employed during determination of three-dimensional refractive indexes to determine above Ny, Nz and θ, and π represents number π.

In a drying process, a web is dried employing a drying apparatus in which the web is alternatively placed on staggered rollers and conveyed, and/or a tenter apparatus in which both edges of the web are held employing clips or pins and the web is conveyed, while maintaining the width. It is preferable that the conveying tension in the drying process is maintained to be as low as possible in the possible range, since it is possible to maintain retardation value Ro to be low. The above conveying tension is preferably at most 190 N/m, is more preferably at most 170 N/m, but is most preferably 100-130 N/m. Specifically, it is effective to maintain the conveying tension to be less or equal to the above conveying tension until the residual solvents in the film reaches at most 5 percent by weight.

A common drying method is that heated air flow is blown onto both sides of a web. A method is also available in that instead of air flow, heating is performed by the application of microwave. Excessively quick drying tends to deteriorate the flatness of the finished film. It is preferable that high temperature drying is initiated when the amount of residual solvents reaches at most 8 percent by weight. Through the entire drying, drying is performed in the temperature range of 40-250° C. It is particularly preferable that drying is performed in the range of 40-160° C.

In the drying process after peeling a web from the surface of the casting support, the web tends to contract in the lateral direction due to evaporation of solvents. When quick drying is performed at a higher temperature, the above contraction increases.

It is preferable that drying is performed while retarding the above contraction as small as possible to enhance the flatness of the finished film.

In view of the foregoing, available is the method (called the tenter system) disclosed, for example, in JP-A No. 62-46625 in which drying is conducted in such a manner that in the entire or partial process, both edges are held in the lateral direction, employing clips or pins while maintaining the web width of the above system, preferably employed are a tenter system employing clips and a pin tenter system employing pins.

In such a case, stretching factor in the lateral direction is preferably 0-100 percent. When employed as a polarizing plate protective film, the stretching factor is more preferably 5-20 percent, but is most preferably 8-15 percent. When employed as a retardation film, it is more preferably 10-40 percent, but is most preferably 20-30 percent. It is possible to control retardation value Ro depending on the stretching factor. The film prepared employing relatively high stretching factor is preferred since the finished film results in excellent flatness. The effects of the present invention are exhibited specifically in the film with a higher stretching factor in which coagulates of minute particles tend to be foreign matter.

When the tenter is performed, the amount of residual solvents in the web is preferably 20-100 percent by weight at the tenter initiation. Further, it is preferable that until the amount of the residual solvents in the web reaches at most 10 percent by weight, but more preferably at most 5 percent by weight, drying is performed while applying tenter.

When the tenter is performed, the drying temperature is preferably 30-150° C., is more preferably 50-120° C., but is most preferably 70-100° C. Low drying temperature reduces evapotranspiration of UV absorbers and plasticizers and results in no stained processes. On the other hand, higher drying temperature results in excellent flatness of the film. Further, even in the case of high drying temperature, by employing UV absorbers which hardly evapotranspirate, it is possible to employ conditions in which both the tenter drying temperature and the stretching factor are high, whereby the resulting effects are markedly exhibited.

Further, in the film drying process, the film peeled from the support is further dried so that the amount of residual solvents reaches preferably at most 0.5 percent by weight, more preferably at most 0.1 percent by weight, but most preferably 0-0.01 percent by weight.

In a film drying process, commonly, employed is a roller loft system or a system in which while conveying film employing the aforesaid pin tenter system, drying is performed. Devices to dry film are not particularly, limited, and commonly drying is performed employing heated air flow, infrared radiation, a heating roller, or microwaves. In view of ease of use, it is preferable to achieve drying employing heated air flow. It is preferable in the range of 40-150° C., drying temperature is increased in each of 3-5 steps. Further, drying is more preferably performed in the range of 80-140° C. to improve dimensional stability.

In the process from the position immediately after casting to the completion of drying, air may be employed in the drying device as an ambience, but drying may be preformed in inert gases such as nitrogen gas, carbon dioxide gas, or argon.

However, attention should always be paid for danger approaching the explosion limit of evaporated solvents in the drying ambience.

In the winding process, a web in which the amount of the residual solvents has reached at most 2 percent by weight is wound as a cellulose ester resinous film. By reducing the amount of residual solvents to at most 0.4 percent by weight, it is possible to prepare film exhibiting better dimensional stability.

Employed as a winding method may be those commonly employed such as a constant torque method, a constant tension method, a taper tension method, or a constant internal stress program tension control method, which may be appropriately selected and then used.

Further, in the optical film according to the present invention, when a 20-200 μm thick optical film is prepared employing the solution casting film production apparatus, it is preferable that cellulose acrylate resins are employed as a resin material of the film.

Film thickness may be controlled in such a manner that the dope concentration, the liquid feeding amount of a pump, the slit gap of the cap of a die, the extrusion pressure of a die, and the rate of a casting support are controlled to reach the targeted thickness.

As a means to realize uniform thickness, it is preferable that by employing a film thickness monitoring device, programmed feed-back information is subjected to feed-back to each of the above devices to control the thickness.

The thickness of a cellulose ester resinous film or a cycloolefin resinous film varies depending on used purposes. The thickness of the finished film is commonly in the range of 20-200 μm, but is more preferably in the range of 30-100 μm. Specifically, when employed as a film of liquid crystal image display devices, the thickness is in the range of 40-100 μm.

The tensile strength of the cellulose ester resinous film or cycloolefin resinous film of the present invention is preferably 90-170 N/mm in both the MD and TD directions, but is most preferably 120-160 N/mm.

The moisture content of these is preferably 0.1.-5 percent, is more preferably 0.3-4 percent, but is still more preferably 0.5-2 percent.

The transmittance of the cellulose ester resinous film or cycloolefin resinous film of the present invention is preferably at least 90 percent, is more preferably at least 92 percent, but is still more preferably at least 93 percent. The haze of the above is preferably at most 0.5 percent, is more preferably at most 0.1 percent, but is still more preferably 0 percent.

The curl value of the cellulose ester resinous film or cycloolefin resinous film of the present invention is preferably as low as possible in terms of the absolute value. Distortion direction may be either in the + or − direction. The curl value is preferably at most 30 in terms of the absolute value, is more preferably at most 20, but is most preferably at most 10. The curl value is represented by radius of curvature (1/m).

In the present invention, it may be possible to produce the cellulose ester resinous film or cycloolefin resinous film, employing any embodiment of the aforesaid solution casting film production apparatus.

Further, in the present invention, film edge slitting devices arranged between the end of peeling and the winding are the same as those of the aforesaid melt casting film production apparatus.

In the present invention, a 20-200 μm thick optical film is produced in the following manner. Casting is performed onto a metal rotary drum or a looped metal rotary belt, and after peeling, drying or cooling, and stretching are conducted. In a stretched film winding device, a film edge is slit off at least one time between the end of peeling and the winding. The surface roughness (average surface roughness Ra) of the slit film cross section is specified to 0.05-0.9 μm. The optical film of the present invention, prepared as above, overcomes problems, such as degradation of optical performance in the lateral direction, which occur in the optical film, the width of which is broadened to at least 1400 mm, by achieving the targeted surface of the cross section of the optical film. Further, it is possible to achieve quality maintenance such as the decrease in substances stripped from the film cross section, the prevention of film breakage, the improvement of dimensional stability of the film, whereby it is possible to produce an optical film exhibiting excellent quality.

It is preferable that the optical film of the present invention is employed as a liquid crystal display member, specifically as a polarizing plate protective film, since it exhibits excellent optical performance in the lateral direction. Specifically, the optical film of the present invention is preferably employed as a polarizing plate protective film, for which high optical performance is demanded.

The polarizing film, as described herein, refers to one which is prepared in such a manner that film such as a polyvinyl alcohol film, capable of being stretched and oriented, is treated with dichroic dyes such as iodine and then stretched in the longitudinal direction. Since the polarizing film itself exhibits neither sufficient strength nor durability, a cellulose acetate film with no anisotropy is allowed to adhere on both sides to produce a polarizing plate.

The above polarizing plate may be produced by allowing the retardation film of the present invention to adhere on the above polarizing plate, or by allowing the retardation film of the present invention to directly adhere on the polarizing film so that the above retardation film functions as a protective film. Adhesion methods are not particularly limited, and it is possible to achieve adhesion employing an adhesive composed of an aqueous solution of water-soluble polymers. Preferably employed as such a water-soluble polymer adhesive is an aqueous solution of completely saponifying type polyvinyl alcohol. Further, as briefly described above, it is possible to prepare a long-length polarizing plate by allowing a long-length polarizing film treated with dichroic dyes to adhere to the long-length retardation film of the present invention. The polarizing plate may be of an adhesive type (by peeling a peelable sheet, it is possible to easily adhere to a liquid cell) in which a peelable sheet is laminated on one side or both sides via a pressure-sensitive adhesive layer (for example, a pressure-sensitive acrylic adhesive layer).

It is possible to apply the polarizing plate, prepared as above, to various display devices. Particularly preferred are liquid crystal display devices employing a liquid crystal cell of a VA mode in which during no application of voltage, liquid crystal molecules are substantially oriented vertically and a TN mode in which during no application of voltage, liquid crystal molecules are oriented horizontally and twisted.

It is possible to prepare the above polarizing plate employing common methods. For example, there is a method in which an optical film or a cellulose ester film, which has undergone alkali saponification, is allowed to adhere, employing an aqueous complete saponification type polyvinyl alcohol solution, to both sides of the polarizing film which is prepared by immersing a polyvinyl alcohol film into an iodine solution and then stretched. Alkali saponification, as described herein, refers to the treatment in which cellulose ester film is immersed into a highly alkali liquid at a relatively high temperature so that wettability to water based adhesives is enhanced and adhesive properties are improved.

It is possible to apply, onto the cellulose ester resinous film or cycloolefin resinous film of the present invention, various functional layers such as a hardcoat layer, an anti-glaring layer, an antireflection layer, an anti-staining layer, an eclectically conductive layer, an optical anisotropic layer, a liquid crystal layer, an orientation layer, an adhesion layer, or a subbing layer. It is possible to arrange these functional layers, employing methods such as coating, vacuum evaporation, sputtering, plasma CVD, or an atmospheric pressure plasma treatment.

Further, in the polarizing plate, the above optical film constitutes at least one side of two polarizing plate protective films. The polarizing plate, prepared as above, is arranged on one or both sides of a liquid crystal cell, and by employing the above, a liquid crystal display device is prepared.

By employing the polarizing plate protective film composed of the optical film of the present invention, it is possible to provide a polarizing plate which results in excellent durability, dimensional stability, and optical isotropy along with a decrease in thickness.

Further, the liquid crystal display device employing such a polarizing plate is capable of maintaining stable display performance over an extended period.

Further, it is possible to employ the optical film according to the present invention as a component of others such as an antireflection film or an optical compensation film.

EXAMPLES

The present invention will now be described with reference to examples, however the present invention is not limited thereto.

Example 1

(Production of Optical Film Employing Melt Casting Film Production Apparatus)

A norbornene resin film as the optical film of the present invention at a final film thickness of 80 μm was produced employing a melt casting film production apparatus.

| | |
|---|---|
| Norbornene resin (ZEONOA 1420, produced by Nippon Zeon Co., Ltd.) | 100 weight parts |
| Synthesized silica | 0.2 weight part |
| Fatty acid amide solvent | 0.2 weight part |

The above materials were blended and melted at 250° C., employing a biaxial extruder. The resulting melt was filtered employing FINEMET NF (at an official filtration rating of 15 μm), produced by Nippon Seisen Co., Ltd. and then palletized. The resulting pellets were melted and filtered twice, employing FINEMET NF (at an official filtration accuracy of 20 μm), produced by Nippon Seisen Co., Ltd. Thereafter, melt extrusion was preformed at a melt temperature of 250° C. from the T-die which was the same as above described on a drum cooled to 30° C. to form a sheet, and cooled to solidify the sheet, whereby a norbornene resinous sheet was prepared.

The resulting sheet was stretched at 160° C. by a factor of 1.5 in the lateral direction employing a tenter, and while being held by tenter clips, cooled to 30° C., followed by releasing from the clips.

Between the end of stretching and the winding, a device which slit off film edges was arranged at each of the right and left edges of the film (the number of the arranged slitting device was one per side) and the film edges were slit off. The employed slitting device was composed of a disk type upper rotary blade and a roller type lower rotary blade. The material of the upper rotary blade was super steel. The diameter of the upper rotary blade was 200 mm, while the blade thickness at the position of slitting was 0.5 mm.

On the other hand, the material of the roller shaped lower rotary blade was super steel, and the diameter of the roller of the lower rotary blade was 100 mm.

The surface roughness (average surface roughness Ra) of the film cross section was determined, and found to be 0.06 μm. The cross section of the slit film was relatively smooth and no slitting scrach was observed. Further, no film tearing of the film during conveying was observed.

The surface roughness of the film cross section was determined employing a surface roughness meter (NEWVIEW 5010), produced by ZYGO Co., under the instrument conditions of the objective lens by a factor of 50 and the image zoom by a factor of 1.3. In this case, determination conditions were appropriately set employing Mesure Cntrl Key, and recorded data was processed upon suitably setting Analyze Cntrl Key.

As described above, a norbornene resin film at a final width of 1,440 mm and a thickness of 80 μm was obtained and wound employing a winder.

Further, the retardation values (Rt and Ro) of the slit norbornene resin film was measured at every 20 mm in the lateral direction at an arbitrary position in the longitudinal direction of the film.

The dimensional variation ratio, as described herein, was determined as follows. The percentage of the length (the lateral length) soon after production of a norbornene resinous film to the changed length (the lateral length) after allowing the above film to stand at an ambience of 90° C. and 5 percent relative humidity for 120 hours was obtained.

The variation of the retardation values of Rt in the lateral direction, namely, ΔRt, was 4 nm, while the variation of the retardation values Ro in the lateral direction, namely, ΔRo, was 2 nm.

Table 1 below summarizes the production conditions of the norbornene resin film in Example 1, as well as the determined results.

Examples 2-7

Norbornene resin films were prepared using the same material as Example 1 employing a melt casting apparatus with changing the width and the thickness of the films.

The surface roughness (the average surface roughness Ra) of the cross section of each of the slit films was determined in the same manner as Example 1 and found to lie in the range of 0.5-0.6 μm. ΔRt and ΔRo were found to lie in the ranges of 4-6 nm and 1.5-3 nm, respectively.

The preparation conditions and obtained results of Examples 2-7 were summarized in Table 1.

Comparative Example 1

Between the end of stretching and the winding, two devices which slit off film edges were arranged at each of the right and left edges of the film (the number of the arranged slitting device was two per side) and the film edges were slit off. The employed slitting device was composed of a disk type upper rotary blade and a roller type lower rotary blade. The material of the upper rotary blade was SUS316. The diameter of the upper rotary blade was 180 mm, while the blade thickness at the position of slitting was 0.2 mm.

On the other hand, the material of the roller shaped lower rotary blade was SUS316, and the diameter of the roller of the lower rotary blade was 73 mm.

The surface roughness (average surface roughness Ra) of the film cross section was determined, and found to be 1.1 μm. The cross section of the slit film was found to be rough even by visual observation.

As described above, a norbornene resin film at a final width of 1,440 mm and a thickness of 80 μm was obtained and wound employing a winder.

ΔRt and ΔRo were determined to be 11 nm and 7 nm, respectively, which were larger than those observed for the above Examples.

The preparation condition and obtained results of Comparative Example 1 were also summarized in Table 1.

Example 8

(Production of Optical Film Employing Solution Casting Film Production Apparatus)

Upon producing a cellulose acylate film at a targeted dried film thickness of 80 μm employing a solution casting film production apparatus, initially, a dope was prepared.

| (Dope Composition) | |
|---|---|
| Cellulose ester | 100 weight parts |
| Triphenyl phosphate | 8 weight parts |
| Ethylphthalyl ethyl glycolate | 2 weight parts |
| TINUVIN 109 (produced by CIBA Specialty Chemicals Co., Ltd.) | 0.5 weight part |
| TINUVIN 171 (produced by CIBA Specialty Chemicals Co., Ltd.) | 0.5 weight part |
| Methylene chloride | 300 weight parts |
| Methanol | 60 weight parts |

The above materials were charged into a sealed dope dissolution vessel, and heated, and completely dissolved while stirring. Incidentally, of the above materials, UV absorbers were charged into an additive dissolution vessel to prepare the UV absorber addition solution described below. Thereafter, the dope in the dissolution vessel was introduced to a primary filter and was subjected to primary filtration. In the primary filter, the above dope was filtered employing FINEMET NF produced by Nippon Seisen Co., Ltd.

The dope after the primary filtrating was temporarily stored in a dope stock vessel, and subsequently, the dope was introduced to a secondary filter equipped with a metal sintered filter from the dope stock vessel, whereby it was subjected to secondary filtration.

On the other hand, the UV absorber addition solution which had been prepared in the additive dissolution vessel was introduced into a filter and filtered previously. The dope after the above secondary filtration was introduced into a static mixer. Prior to the static mixer, the UV absorber addition solution after the filtration was introduced, and the above UV absorber addition solution was subjected to in-line addition to the dope.

The dope after being added with the UV absorber addition solution was introduced into the casting die of a belt casting device, and a cellulose ester film was prepared employing a solution casting film production apparatus.

Namely, the cellulose ester dope, prepared as above, was uniformly cast at 30° C. onto a stainless steel band support. On the stainless steel band support, solvents are evaporated until the amount of the residual solvents reached 100 percent by weight. Subsequently, peeling from the stainless steel band support at a peeling tension of 162 N/m, employing a peeling roller. The peeled cellulose ester web was subjected to solvent evaporation at 35° C., and slit to result in a width of 1,650 mm. Thereafter, while stretching by a factor of 1.1 in the lateral direction employing a tenter, drying was performed at a drying temperature of 135° C. Thereafter, drying was finished in such a manner that conveyance through drying zones at 110° C. and 120° C. was performed employing many rollers.

Between the end of drying and the winding, two film edge slitting off devices along the film edge on each of the left and right edges were arranged (two slitting devices per one side), and film edges were slit off. The employed slitting device was composed of a disk type upper rotary blade. The material of the upper rotary blade was super steel and the diameter of the upper rotary blade was 180 mm, while the blade thickness at the position of slitting was 0.8 mm.

The surface roughness of the cross section of the slit film (the average surface roughness Ra) was determined in the same manner as Example 1, and found to be 0.06 μm. The cross section of the slit film was relatively smooth and no slitting powder was present. Further, no cellulose ester film tearing during conveyance was observed.

As described above, a cellulose eater film at a final product width of 1,455 mm and thickness of 80 μm was prepared and wound employing a winder.

Further, ΔRt and ΔRo were measured in the same manner as in Example 1, and found be 4 nm and 1.5 nm, respectively.

The preparation condition and obtained results of the cellulose ester film of Example 8 were also summarized in Table 1.

Example 9

A cellulose ester film was prepared using the same material as Example 8 employing a melt casting apparatus with changing the width of the film.

The surface roughness (the average surface roughness Ra) of the cross section of the slit film was measured in the same manner as Example 1 and found to be 0.7 μm. ΔRt and ΔRo were found to be 6 nm and 3 nm, respectively.

The preparation condition and obtained results of the cellulose ester film of Example 9 were also summarized in Table 1.

Comparative Example 2

For comparison, preparation was conducted in the same manner as Example 8 except that, between the end of drying and the winding, two film edge slitting off devices along the film edge on each of the left and right edges were arranged (two slitting devices per one side), and film edges were slit off. The employed slitting device was composed of a disk type upper rotary blade and a roller type lower rotary blade. The material of the upper rotary blade was SUS 316 steel and the diameter of the upper rotary blade was 180 mm, while the blade thickness at the position of slitting was 0.2 mm.

On the other hand, the material of the roller shaped lower rotary blade was SUS316, and the diameter of the roller of the lower rotary blade was 73 mm.

The surface roughness (average surface roughness Ra) of the film cross section was determined, and found to be 1.1 μm. The cross section of the slit film was found to be rough even by visual observation.

As described above, a cellulose ester film at a final width of 1,455 mm and a thickness of 80 μm was obtained and wound employing a winder.

ΔRt and ΔRo of the slit cellulose ester film were measured in the same manner as Example 1 and determined to be 15 nm and 9 nm, respectively, which were found to be significantly larger.

The preparation condition and obtained results of the cellulose ester film of Comparative Example 2 were also summarized in Table 1.

TABLE 1

|  | Surface roughness: Ra (μm) | Film Thickness (μm) | Film Width (mm) | Resin | ΔRt | ΔRo |
|---|---|---|---|---|---|---|
| Example 1 | 0.06 | 80 | 1440 | norbornene | 4 nm | 2 nm |
| Example 2 | 0.5 | 80 | 1440 | norbornene | 5 nm | 2.5 nm |
| Example 3 | 0.6 | 80 | 2600 | norbornene | 6 nm | 2 nm |
| Example 4 | 0.5 | 80 | 1600 | norbornene | 5 nm | 2 nm |
| Example 5 | 0.5 | 30 | 1440 | norbornene | 5 nm | 1.5 nm |
| Example 6 | 0.5 | 180 | 1440 | norbornene | 6 nm | 2 nm |
| Example 7 | 0.6 | 220 | 1440 | norbornene | 6 nm | 3 nm |
| Example 8 | 0.06 | 80 | 1455 | cellulose ester | 4 nm | 1.5 nm |

TABLE 1-continued

|  | Surface roughness: Ra (μm) | Film Thickness (μm) | Film Width (mm) | Resin | ΔRt | ΔRo |
|---|---|---|---|---|---|---|
| Example 9 | 0.7 | 80 | 1600 | cellulose ester | 6 nm | 3 nm |
| Comparative Example 1 | 1.1 | 80 | 1440 | norbornene | 11 nm | 7 nm |
| Comparative Example 2 | 1.2 | 80 | 1455 | cellulose ester | 15 nm | 9 nm |

EFFECTS OF THE INVENTION

The optical film according to the present invention results in a surface roughness (average surface roughness Ra) of a slit film of 0.05-0.9 μm. When the optical film of the present invention is employed, based on achievement of the targeted cross section of the optical film, solved are problems such as degradation of optical performance in the lateral direction which occurs in a wide optical film of a width of 1400 mm or more, and achieved is quality maintenance such as a decrease in stripped materials from the cross section of the film, prevention of film tearing, and improvement of dimensional stability of the film, whereby effects are exhibited in which it is possible to produce an optical film exhibiting excellent optical performance.

What is claimed is:

1. A method for producing an optical film comprising a cycloolefin resin or a cellulose ester resin comprising the steps of:
   (i) melt casting or solution casting a cycloolefin resin or a cellulose ester resin on a rotary drum support or on a rotary endless belt support to form a cast film;
   (ii) peeling the cast film from the support to form a peeled film;
   (iii) stretching the peeled film to form a stretched film;
   (iv) drying the stretched film;
   (v) slitting at least one of two edges of the stretched film; and
   (vi) winding the stretched film in a roll,
   wherein
   (a) a stretching factor of the peeled film is 1.05-1.3 in both the machine direction and the transverse direction;
   (b) a residual solvent content in the stretched film is 0.5% or less by weight in the slitting step;
   (c) a width of the stretched film after slitting is 1400 mm or more; and
   (d) an average surface roughness Ra specified in JISB0601-2001 of a cross-section of the at least one slit edge of the stretched film formed by slitting is 0.05 to 0.9 μm.

* * * * *